(12) United States Patent
Laurent-Michel et al.

(10) Patent No.: US 9,917,618 B2
(45) Date of Patent: Mar. 13, 2018

(54) PAPR REDUCTION IN A MICROWAVE BACKHAUL OUTDOOR UNIT

(71) Applicant: MAXLINEAR, INC., Carlsbad, CA (US)

(72) Inventors: Stephane Laurent-Michel, Tustin, CA (US); Raghuraman Mariappan, Bangalore (IN)

(73) Assignee: MAXLINEAR, INC., Carlsbad, CA (US)

( * ) Notice: Subject to any disclaimer, the term of this patent is extended or adjusted under 35 U.S.C. 154(b) by 0 days.

(21) Appl. No.: 15/200,598

(22) Filed: Jul. 1, 2016

(65) Prior Publication Data

US 2017/0006610 A1    Jan. 5, 2017

Related U.S. Application Data

(60) Provisional application No. 62/203,454, filed on Aug. 11, 2015.

(30) Foreign Application Priority Data

Jul. 1, 2015    (IN) ............................ 1988/DEL/2015

(51) Int. Cl.
*H04B 3/36*    (2006.01)
*H04B 1/04*    (2006.01)

(52) U.S. Cl.
CPC ............. *H04B 3/36* (2013.01); *H04B 1/0475* (2013.01)

(58) Field of Classification Search
CPC .. H04B 1/0007; H04B 1/0028; H04B 1/0035; H04B 1/04; H04B 1/0408; H04B 1/0416; H04B 1/0458; H04B 1/0475; H04B 3/36; H04B 3/56; H04B 3/58; H04L 5/0001; H04L 5/003; H04L 27/04; H04L 27/12; H04L 27/2614; H04L 27/2615; H04L 27/2626; H04L 27/2627; H04L 27/36; H04L 27/367; H04L 27/368
USPC ....... 375/135, 146, 211, 213, 260, 295–297; 370/315, 339, 340; 455/91, 114.2, 114.3, 455/128, 129
See application file for complete search history.

(56) References Cited

U.S. PATENT DOCUMENTS

| 2006/0067426 A1* | 3/2006 | Maltsev ............ H04L 27/2602 375/297 |
| 2007/0217329 A1* | 9/2007 | Abedi ................ H04L 27/2614 370/208 |
| 2010/0238849 A1* | 9/2010 | Klein .................. H04B 1/0458 370/297 |

* cited by examiner

*Primary Examiner* — Young T Tse
(74) *Attorney, Agent, or Firm* — McAndrews, Held & Malloy, Ltd.

(57) ABSTRACT

Aspects of methods and systems for PAPR reduction in a microwave backhaul outdoor unit are provided.

17 Claims, 7 Drawing Sheets

PAPR REDUCTION IN A MICROWAVE BACKHAUL OUTDOOR UNIT

CROSS-REFERENCE TO RELATED APPLICATIONS/INCORPORATION BY REFERENCE

This application claims benefit from and priority to Indian Application No. 1988/DEL/2015, filed Jul. 1, 2015, and U.S. Application No. 62/203,454, filed Aug. 11, 2015. The above-identified applications are hereby incorporated by reference herein in their entirety.

BACKGROUND

Limitations and disadvantages of conventional approaches to microwave backhaul will become apparent to one of skill in the art, through comparison of such systems with some aspects of the present invention as set forth in the remainder of the present application with reference to the drawings.

BRIEF SUMMARY OF THE INVENTION

Systems and methods are provided for PAPR reduction in a microwave backhaul outdoor unit, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1A:
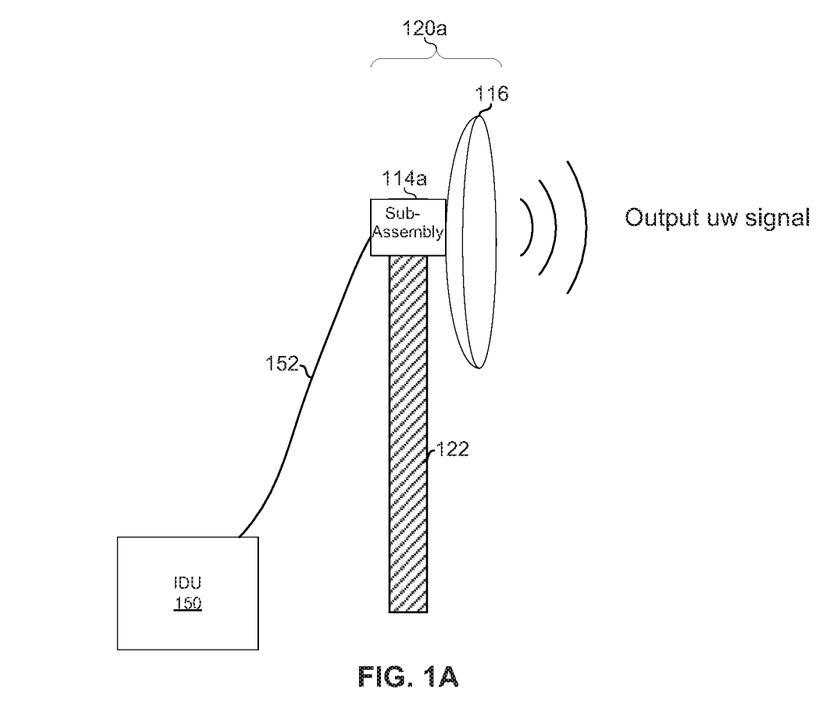
FIG. 1A is a diagram illustrating an example microwave backhaul outdoor unit (ODU).

FIG. 1A is a diagram illustrating an example microwave backhaul system comprising an indoor unit (IDU) and an outdoor unit (ODU). The ODU 120a comprises subassembly 114a and antenna 116 (e.g., parabolic dish antenna) mounted to a structure 122 (a tower in the example shown). In operation, signals from IDU 150 are received by subassembly 114a via link 152 (e.g., coax, fiber, wireless, or any other suitable link) and processed for transmission onto a wireless microwave backhaul link via antenna 116. The processing performed in subassembly 114a is further described below.

Figure 1B:
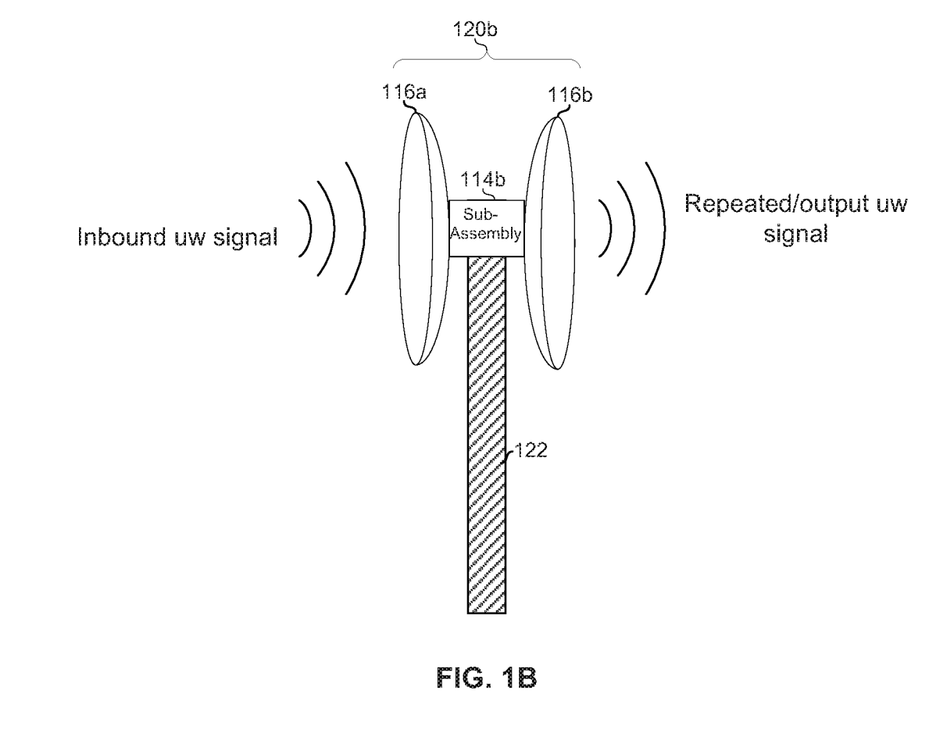
FIG. 1B is a diagram illustrating an example microwave backhaul outdoor unit (ODU) configured to operate as a repeater.

FIG. 1B is a diagram illustrating an example microwave backhaul outdoor unit (ODU) configured to operate as a repeater. The ODU 120b comprises subassembly 114b and antennas 116a and 116b (e.g., parabolic dish antennas) mounted to a structure 122 (a tower in the example shown). In operation, the ODU 120 operates as a repeater such that a microwave signal is received via antenna 116a, processed by subassembly 114b, and then transmitted via antenna 116b. The processing performed in subassembly 114b is further described below.

Figure 2A:
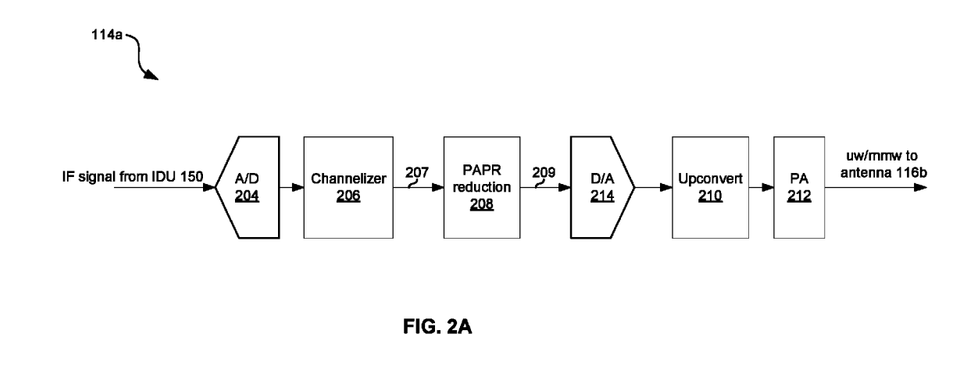
FIG. 2A is a generalized block diagram of circuitry of the ODU of FIG. 1A.

FIG. 2A is a generalized block diagram of circuitry of the ODU of FIG. 1A. The example implementation of circuitry 114a comprises analog-to-digital converter (ADC) 204, channelizer 206, PAPR reduction circuitry 208, digital-to-analog converter (DAC) 214, upconverter 210, and power amplifier 212.

The analog-to-digital converter (ADC) 204 concurrently digitizes the entire IF signal (thus, concurrently digitizing the entire range of frequencies allocated for communications from the IDU 150 to the ODU 120a on the link 152.)

The channelizer 206 selects one or more desired subbands of the digitized L-band signal and conveys them to PAPR reduction circuit 208 as signal 207.

Figure 3:
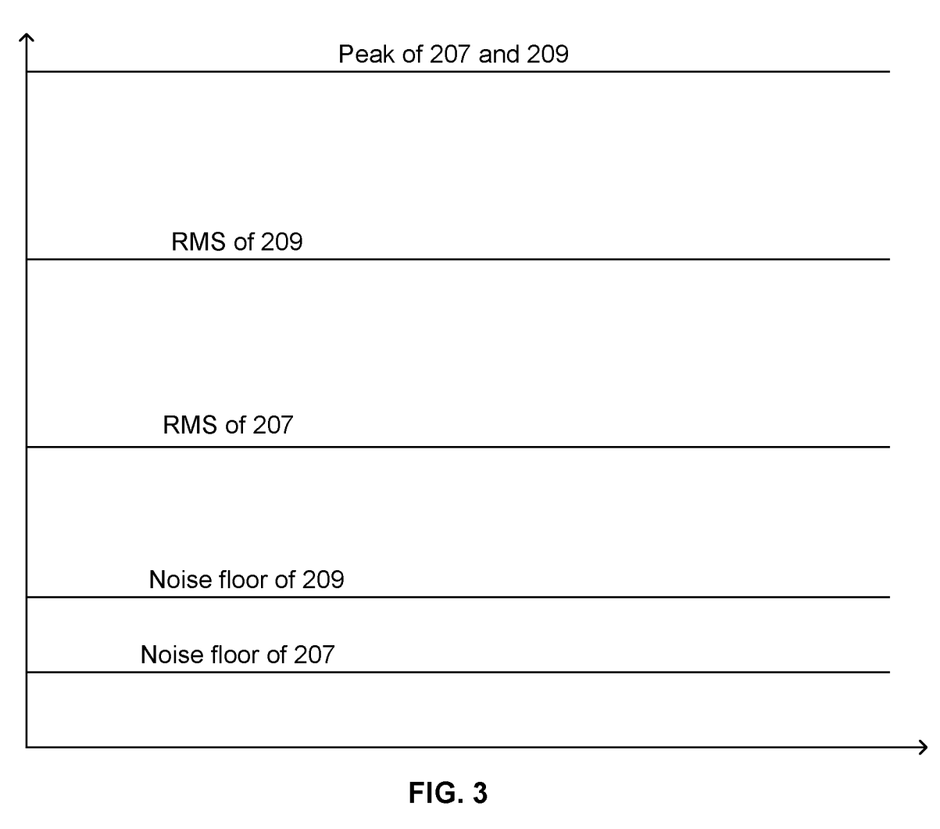
FIG. 3 illustrates signal levels before and after PAPR reduction.

The PAPR reduction circuitry 208 is operable to reduce the peak-to-average-power ratio (PAPR) of signal 207, resulting in signal 209. Referring briefly to FIG. 3, the PAPR reduction may operate to maintain the peak level while increasing the root-mean-square (RMS) level of the signal to reduce the PAPR. The tradeoff for increasing the RMS level is a slightly higher noise floor for signal 209, but the RMS rises more than the noise floor.

Returning to FIG. 2A, DAC 214 converts the signal 209 to an analog representation, the upconverter 210 upconverts the analog signal back to the microwave band, and the power amplifier 212 amplifies the upconverted signal for transmission via antenna 116b. In another implementation, where the circuits 204, 206, 208, and 214 are capable of handling the RF frequency, this signal may already be at the microwave frequency and the upconverter 210 may be absent.

Figure 2B:
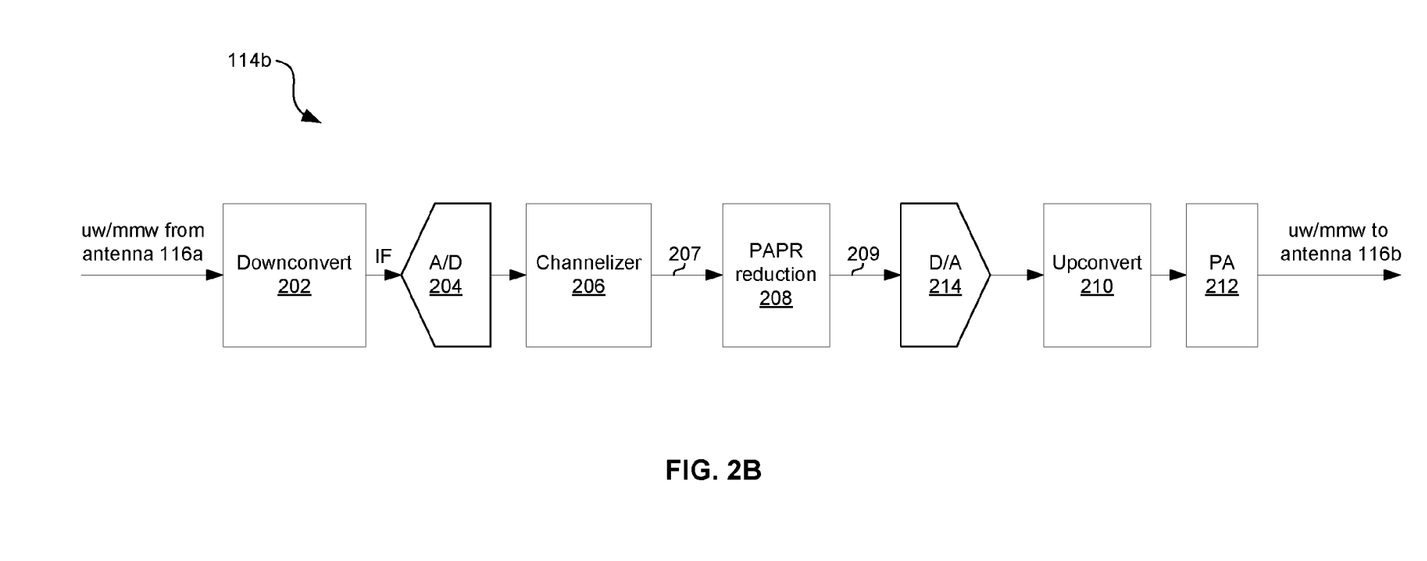
FIG. 2B is a generalized block diagram of circuitry of the ODU of FIG. 1B.

FIG. 2B is a generalized block diagram of circuitry of the ODU of FIG. 1B. The depicted subassembly 114b is similar to the subassembly 114a of FIG. 2A, but additionally comprises a downconverter 202

The downconverter 202 receives a microwave signal (where "microwave" is used to cover frequencies anywhere from 300 MHz to 300 GHz) from the antenna 116a and block downconverts it (i.e., downconverts the whole band of frequencies allocated for use by microwave backhaul link) to an intermediate frequency (IF) signal. The IF signal may, for example, be an L-band signal centered around 1 to 2 GHz. In another example implementation, rather than downconverting to IF, the downconverter 202 may downconvert to baseband. In still another implementation, where the circuits 204, 206, 208, and 214 are capable of handling radio frequencies, then the downconverter 202 may be absent.

The analog-to-digital converter (ADC) 204 concurrently digitizes the entire IF signal from the downconverter 202 (thus, concurrently digitizing the entire range of frequencies allocated for use by the microwave link.)

The channelizer 206 and PAPR reduction circuitry 208 operate as described above.

In another example implementation, repeater functionality may be performed at the packet level. That is, a received µw signal may be demodulated to recover a packet carried therein, and then the packet remodulated and sent on a µw signal. In FIG. 1B, as an example, this may be performed by circuitry of subassembly 114b in FIG. 1B. As another example, in FIG. 1A, this may be performed by a combination of one or more subassemblies 114a and one or more IDUs 150.

Figure 4:
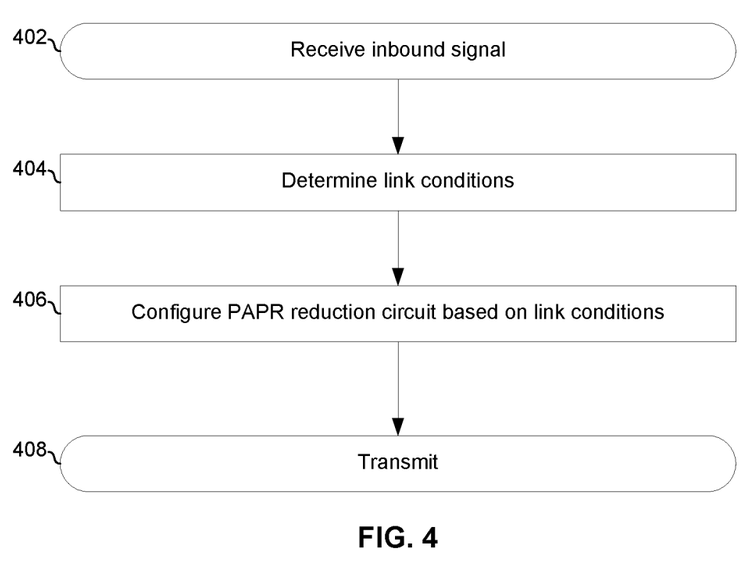
FIG. 4 is a flowchart illustrating configuration of the ODUs of FIGS. 1A and 1B.

FIG. 4 is a flowchart illustrating configuration of the ODUs of FIGS. 1A and 1B. The process begins block 402 in which a signal to be transmitted (e.g., a signal from IDU 150 in ODU 120a or a signal from antenna 116A in ODU 120b) is received. In block 404, link conditions of the output microwave link onto which the signal is to be transmitted are determined. In block 406, the PAPR reduction circuit 208 is configured for transmitting the signal based on the determined link conditions. For example, if the outbound link is noise limited at the receiver, then the PAPR reduction circuitry 208 may be enabled to reduce PAPR for this signal, but if the link is limited by some other factor, then the PAPR reduction circuitry 208 may be disabled and/or bypassed for this signal. As another example, the signal PAPR reduction can be used to increase the average (e.g., RMS average) Tx power of the ODU when conditions on the µw link are such that, on the far end receiver, the Rx carrier-to-noise ratio (CNR) is limited by the channel and not by the transmitter CNR. In this case, the increased Tx RMS power and the reduced TX CNR resulting from operations of the PAPR reduction circuit 208 still result in an increase in Rx CNR, as compared to without the PAPR reduction circuit 208. In this manner, PAPR reduction circuitry 408 may be dynamically configured based on available link budget (e.g., on periodic basis, on a per-transmission-burst basis, and/or the like). In block 408, the signal is transmitted on the output bound link. As an example, determining the link conditions may comprise determining carrier to noise ratio and then the PAPR reduction based be controlled based on a tradeoff between PAPR and CNR.

Figure 5:
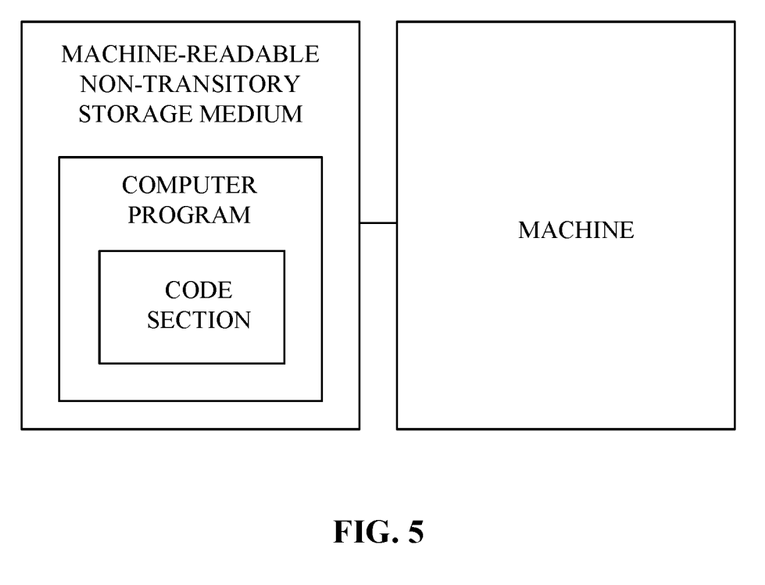
FIG. 5 is a generalized block diagram of a machine and machine-readable non-transitory storage.

FIG. 5 shows machine-readable non-transitory storage medium, a computer program, a code section, and a machine according to an embodiment of the present disclosure.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may provide a non-transitory computer readable medium and/or storage medium, and/or a non-transitory machine readable medium and/or storage medium, having stored thereon, at least one code section executable by a computing system, thereby causing the computing system to perform processes as described herein.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A wireless backhaul system, comprising:
an antenna operatively coupled to a subassembly,
wherein:
 the subassembly is configured to receive a first signal,
 the subassembly includes a first circuit and a second circuit,
 the first circuit is configured to select one or more subbands of the first signal and to send the one or more selected subbands of the received first signal as a second signal to the second circuit,
 the second circuit is configured to reduce a peak-to-average-power ratio (PAPR) of the second signal and to transmit the reduced PAPR signal via the antenna, and
 the second circuit is configured to reduce the PAPR of the second signal by maintaining a peak level of the second signal while increasing a root-mean-square (RMS) level of the second signal.

2. The wireless backhaul system according to claim 1, further comprising:
an indoor subsystem that is configured to provide the first signal to the subassembly.

3. The wireless backhaul system according to claim 2, wherein the subassembly is part of an outdoor subsystem.

4. The wireless backhaul system according to claim 1, wherein the first signal is an intermediate frequency (IF) signal.

5. The wireless backhaul system according to claim 4, wherein the subassembly further includes an analog-to-digital converter that is configured to convert the IF signal into a digital IF signal.

6. The wireless backhaul system according to claim 1, wherein the first signal includes a digitized L-band signal, and wherein the first circuit is configured to select one or more subbands of the digitized L-band signal and to send the selected one or more subbands of the digitized L-band signal as the second signal to the second circuit.

7. The wireless backhaul system according to claim 1, wherein the subassembly is mounted on an outdoor structure, and the antenna is mounted on the subassembly.

8. The wireless backhaul system according to claim 1, wherein the antenna includes a first antenna, and the the wireless backhaul system further includes a second antenna, and the first signal received by the subassembly is based on a wireless signal received by the first antenna.

9. The wireless backhaul system according to claim 8, wherein the first antenna, the second antenna, and the subassembly are part of a repeater.

10. The wireless backhaul system according to claim 8, wherein the first antenna, the second antenna, and the subassembly are part of a repeater that is configured to perform a repeater functionality at a packet level.

11. A wireless backhaul system, comprising:
an antenna operatively coupled to a subassembly, wherein:
the subassembly is configured to receive a first signal,
the subassembly includes a first circuit and a second circuit,
the first circuit is configured to select one or more subbands of the first signal and to send the one or more selected subbands of the received first signal as a second signal to the second circuit,
the second circuit is configured to reduce a peak-to-average-power ratio (PAPR) of the second signal and to transmit the reduced PAPR signal via the antenna,
the second circuit is configured to be disabled or bypassed, and
the second circuit is configured to be dynamically adapted based on link conditions.

12. A method for providing a wireless backhaul, comprising:
receiving a first signal;
selecting, by a first circuit, one or more subbands of the first signal;
sending the selected one or more subbands of the first signal to a second circuit as a second signal;
reducing, by the second circuit, a peak-to-average-power ratio (PAPR) of the second signal, wherein reducing the PAPR of the second signal includes maintaining a peak level of the second signal while increasing a root-mean-square (RMS) level of the second signal; and
wirelessly transmitting the reduced PAPR signal.

13. The method according to claim 12, wherein the first signal is provided by an indoor subsystem, and wherein the first circuit or the second circuit is part of an outdoor subsystem.

14. The method according to claim 12, wherein the first signal is a digital intermediate frequency (IF) signal.

15. The method according to claim 12, wherein the first signal includes a digitized L-band signal, and wherein the first circuit selects one or more subbands of the digitized L-band signal and sends the selected one or more subbands of the digitized L-band signal as the second signal to the second circuit.

16. The method according to claim 12, wherein the first signal is based on a wireless signal received by a first antenna, the reduced PAPR signal is wirelessly transmitted by a second antenna, and the first antenna and the second antenna are part of a repeater.

17. A machine-readable non-transitory storage medium having stored thereon, a computer program having at least one code section for networking, the at least one code section being executable by a machine for causing the machine to perform operations comprising:
receiving a first signal;
selecting one or more subbands of the first signal;
sending the selected one or more subbands of the first signal to a second circuit as a second signal;
reducing a peak-to-average-power ratio (PAPR) of the second signal based on the selected one or more subbands of the first signal, wherein reducing the PAPR of the second signal includes maintaining a peak level of the second signal while increasing a root-mean-square (RMS) level of the second signal; and
wirelessly transmitting the reduced PAPR signal.

* * * * *